US011321100B2

(12) United States Patent
Kruempelmann et al.

(10) Patent No.: US 11,321,100 B2
(45) Date of Patent: May 3, 2022

(54) TEMPLATE BASED INTEGRATION OF MULTIPLE CLOUD-BASED SYSTEMS

(71) Applicant: SAP SE, Walldorf (DE)

(72) Inventors: Wulf Kruempelmann, Altlussheim (DE); Susanne Schott, Mannheim (DE)

(73) Assignee: SAP SE, Walldorf (DE)

( * ) Notice: Subject to any disclaimer, the term of this patent is extended or adjusted under 35 U.S.C. 154(b) by 129 days.

(21) Appl. No.: 16/885,226

(22) Filed: May 27, 2020

(65) Prior Publication Data

US 2021/0373911 A1 Dec. 2, 2021

(51) Int. Cl.
| | | |
|---|---|---|
| *G06F 9/445* | (2018.01) | |
| *G06F 8/60* | (2018.01) | |
| *G06F 16/22* | (2019.01) | |
| *H04L 67/10* | (2022.01) | |
| *G06Q 10/06* | (2012.01) | |
| *G06Q 30/00* | (2012.01) | |
| *G06Q 50/28* | (2012.01) | |
| *G06Q 10/10* | (2012.01) | |

(52) U.S. Cl.
CPC ............ *G06F 9/4451* (2013.01); *G06F 8/60* (2013.01); *G06F 16/2282* (2019.01); *G06Q 10/0631* (2013.01); *G06Q 10/10* (2013.01); *G06Q 30/016* (2013.01); *G06Q 50/28* (2013.01); *H04L 67/10* (2013.01)

(58) Field of Classification Search
CPC ...... G06F 9/4451; G06F 8/60; G06F 16/2282; G06Q 10/0631; G06Q 10/10; G06Q 30/016; G06Q 50/28; H04L 67/10
See application file for complete search history.

(56) References Cited

U.S. PATENT DOCUMENTS

| | | | |
|---|---|---|---|
| 2016/0364445 A1* | 12/2016 | Golec ................. | G06Q 10/10 |
| 2019/0281455 A1* | 9/2019 | Luo .................... | H04W 8/005 |
| 2020/0084270 A1* | 3/2020 | Ignatyev ............ | G06Q 30/0635 |
| 2021/0064347 A1* | 3/2021 | Junior ................ | G06F 8/51 |
| 2021/0152660 A1* | 5/2021 | Reeve ................ | H04L 63/029 |

* cited by examiner

*Primary Examiner* — Michael A Keller
(74) *Attorney, Agent, or Firm* — Mintz Levin Cohn Ferris Glovsky and Popeo, P.C.

(57) ABSTRACT

A method may include determining that a tenant associated with a production system requires a first software application and a second software application available from a development system. The first software application and the second software application may each operate on one or more database tables. A configuration data for establishing a connection between the first software application and the second software application may be available at the development system. As such, the first software application and the second software application may be deployed by sending, to the production system, a first template for the first software application, a second template for the second software application, and the first configuration data. The first template and the second template may each define the one or more database tables. Related systems and articles of manufacture, including computer program products, are also provided.

18 Claims, 5 Drawing Sheets

TEMPLATE BASED INTEGRATION OF MULTIPLE CLOUD-BASED SYSTEMS

TECHNICAL FIELD

The present disclosure generally relates to cloud computing and, more specifically, to integrating multiple cloud-based systems.

BACKGROUND

An application may be hosted by a cloud-computing platform such that the application may be remotely accessible to multiple tenants, for example, over the Internet. For example, the application may be available as a cloud-based service including, for example, a software as a service (SaaS) and/or the like. Many organizations may rely on such cloud-based software applications including, for example, enterprise resource planning (ERP) software, customer relationship management (CRM) software, and/or the like. These cloud-based applications may provide a variety of data processing functionalities including, for example, payroll, time and attendance management, recruiting and onboarding, learning and development, performance and compensation, workforce planning, and/or the like.

SUMMARY

Methods, systems, and articles of manufacture, including computer program products, are provided for integrating multiple cloud-based systems. In one aspect, there is provided a system including at least one processor and at least one memory. The at least one memory can store instructions that cause operations when executed by the at least one processor. The operations may include: determining that a tenant associated with a production system requires a first software application and a second software application available from a development system, the first software application and the second software application each operating on one or more database tables; in response to determining that the tenant requires the first software application and the second software application, determining that a first configuration data for establishing a first connection between the first software application and the second software application is available at the development system, the first configuration data establishing the first connection by at least setting one or more credentials that enable the first software application to access one or more functionalities of the second software application; and deploying, to the production system, the first software application and the second software application by at least sending, to the production system, a first template for the first software application, a second template for the second software application, and the first configuration data, the first template and the second template each defining the one or more database tables.

In some variations, one or more of the features disclosed herein including the following features can optionally be included in any feasible combination. A template may be generated for each of a plurality of software applications available from the development system. The plurality of software applications may include the first software application, the second software application, and a third software application. The first configuration data for establishing the first connection between the first software application and a second configuration data for establishing a second connection between the first software application and the third software application may be generated.

In some variations, the first template may be generated to support the first configuration data and the second configuration data.

In some variations, the first template for the first software application, the second template for the second software application, and a third template for the third software application may be stored in a first database table. The first configuration data and the second configuration data may be stored in a second database table. An indication that the first configuration data is available for establishing the first connection between the first software application and that the second configuration data is available for establishing a second connection between the first software application and the third software application may be stored in a third database table.

In some variations, the deploying of the first software application and the second software application may further include: retrieving, from the first database table, the first template and the second template; and in response to determining, based at least on the third database table, that the first configuration data is available for establishing the first connection between the first software application and the second software application, retrieving, from the second database table, the first configuration data.

In some variations, the first connection may be a mandatory connection and the second connection may be an optional connection. The first configuration data may include one or more scripts configured for automatic execution at the production system in order to establish the mandatory connection between the first software application and the second software application.

In some variations, the one or more credentials may include a universal resource locator, a username, a certificate, and/or a password.

In some variations, the first software application and the second software application may each be a different one of an enterprise resource planning (ERP) software application, a customer relationship management (CRM) software application, and a supply chain management (SCM) software application.

In some variations, the first software application may be hosted by a first cloud-based system and the second software application may be hosted by a second cloud-based system.

In another aspect, there is provided a method for integrating multiple cloud-based systems. The method may include: determining that a tenant associated with a production system requires a first software application and a second software application available from a development system, the first software application and the second software application each operating on one or more database tables; in response to determining that the tenant requires the first software application and the second software application, determining that a first configuration data for establishing a first connection between the first software application and the second software application is available at the development system, the first configuration data establishing the first connection by at least setting one or more credentials that enable the first software application to access one or more functionalities of the second software application; and deploying, to the production system, the first software application and the second software application by at least sending, to the production system, a first template for the first software application, a second template for the second software application, and the first configuration data, the first template and the second template each defining the one or more database tables.

In some variations, one or more of the features disclosed herein including the following features can optionally be included in any feasible combination. The method may further include: generating, for each of a plurality of software applications available from the development system, a template, the plurality of software applications including the first software application, the second software application, and a third software application; and generating the first configuration data for establishing the first connection between the first software application and a second configuration data for establishing a second connection between the first software application and the third software application.

In some variations, the first template may be generated to support the first configuration data and the second configuration data.

In some variations, the method may further include: storing, in a first database table, the first template for the first software application, the second template for the second software application, and a third template for the third software application; storing, in a second database table, the first configuration data and the second configuration data; and storing, in a third database table, an indication that the first configuration data is available for establishing the first connection between the first software application and that the second configuration data is available for establishing a second connection between the first software application and the third software application.

In some variations, the deploying of the first software application and the second software application may further include: retrieving, from the first database table, the first template and the second template; and in response to determining, based at least on the third database table, that the first configuration data is available for establishing the first connection between the first software application and the second software application, retrieving, from the second database table, the first configuration data.

In some variations, the first connection may be a mandatory connection and the second connection may be an optional connection. The first configuration data may include one or more scripts configured for automatic execution at the production system in order to establish the mandatory connection between the first software application and the second software application.

In some variations, the one or more credentials may include a universal resource locator, a username, a certificate, and/or a password.

In some variations, the first software application may be hosted by a first cloud-based system and the second software application may be hosted by a second cloud-based system.

In another aspect, there is provided a computer program product that includes a non-transitory computer readable medium. The non-transitory computer readable medium may store instructions that cause operations when executed by at least one data processor. The operations may include: determining that a tenant associated with a production system requires a first software application and a second software application available from a development system, the first software application and the second software application each operating on one or more database tables; in response to determining that the tenant requires the first software application and the second software application, determining that a first configuration data for establishing a first connection between the first software application and the second software application is available at the development system, the first configuration data establishing the first connection by at least setting one or more credentials that enable the first software application to access one or more functionalities of the second software application; and deploying, to the production system, the first software application and the second software application by at least sending, to the production system, a first template for the first software application, a second template for the second software application, and the first configuration data, the first template and the second template each defining the one or more database tables.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to template based integration of multiple cloud-based systems, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
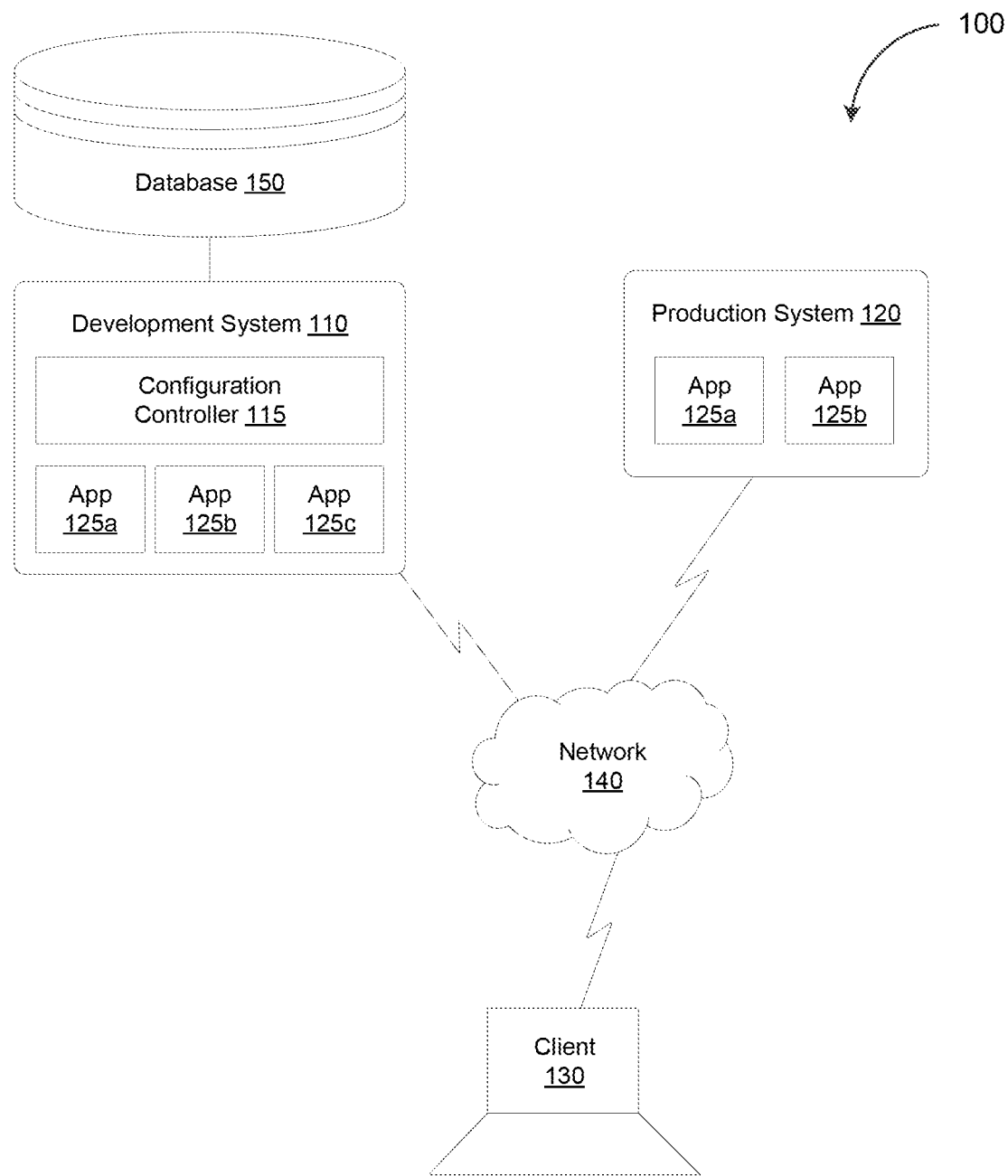
FIG. 1 depicts a system diagram illustrating an example of a multi-cloud configuration system, in accordance with some example embodiments.

When practical, like labels are used to refer to same or similar items in the drawings.

DETAILED DESCRIPTION

A cloud-based software application may operate on data stored in one or more database tables. As such, the cloud-based software application may be implemented based on a template that defines the one or more database tables including, for example, the manner in which data is stored in the database tables. Since the cloud-based software application may be delivered to different tenants with a set of default templates, each tenant may be required configure the cloud-based software application by at least selecting, based on individual requirements, at least one of the default templates before applying, to the selected templates, one or more configurations. In some scenarios, a single tenant may require multiple cloud-based systems, each of which hosting a different cloud-based software application. As such, in addition to configuring each cloud-based software application by configuring the corresponding templates, the tenant may be required to establish connectivity between various cloud-based software applications such that the cloud-based software applications hosted by different cloud-based systems are able to interoperate.

In some example embodiments, a developer may generate, for each cloud-based software application available from the developer, a template that is configured to support configuration data for establishing connectivity between one or more combinations of the cloud-based software applications. For example, the developer may generate, for a first cloud-based software application, a template that is configured to support a first configuration data for establishing connectivity between the first cloud-based software application and a second cloud-based software application as well as a second configuration data for establishing connectivity between the first cloud-based software application and a third cloud-based software application.

The template for each of the first cloud-based software application, the second cloud-based software application, and the third cloud-based software application may be stored in a central database associated with the developer, for example, in a first database table. The central database may also include a second database table storing the first configuration data and the second configuration data. In addition, the central database may include a third database table storing an indication that the first configuration data is available for establishing connectivity between the first cloud-based software application and the second cloud-based software application and that the second configuration data is available for establishing connectivity between the first cloud-based software application and the third cloud-based software application.

In some example embodiments, configuration data for establishing connectivity between two cloud-based software applications may include one or more scripts that may be executed to set the credentials (e.g., universal resource locator (URL), user name, certificate, password, and/or the like) required for accessing the each cloud-based software application. Accordingly, when the developer determines, for example as part of scoping a complex cloud-based system for a tenant, that the tenant requires a combination that includes the first cloud-based software application and the second cloud-based software application, the developer may deliver, in a transport request to the tenant, the template associated with each of the first cloud-based software application and the second cloud-based software application as well as the first configuration data for establishing connectivity between the first cloud-based software application and the second cloud-based software application. The first cloud-based software application and the second software application may be implemented, for example, at the tenant's production system, by deploying the corresponding templates. Moreover, connectivity between the first cloud-based software application and the second cloud-based software application may be realized by deploying the first configuration data.

FIG. 1 depicts a system diagram illustrating an example of a multi-cloud configuration system 100, in accordance with some example embodiments. Referring to FIG. 1, the multi-cloud configuration system 100 may include a development system 110, a production system 120, and a client 130 communicatively coupled via a network 140. The network 140 may be any wired and/or wireless network including, for example, a wide area network (WAN), local area network (LAN), a virtual local area network (VLAN), the Internet, and/or the like. Moreover, the client 130 may be a processor based device including, for example, a smartphone, a desktop computer, a laptop computer, a tablet computer, a workstation, a wearable apparatus, and/or the like.

A variety of cloud-based software applications may be available from a developer associated with the development system 100. For example, FIG. 1 shows a first cloud-based software application 125*a*, a second cloud-based software application 125*b*, and a third cloud-based software application 125*c* as being available from the developer associated with the development system 110. The first cloud-based software application 125*a*, the second cloud-based software application 125*b*, and the third cloud-based software application 125*c* may each be a different cloud-based software application including, for example, an enterprise resource planning (ERP) software application, a customer relationship management (CRM) software application, a supply chain management (SCM) software application, and/or the like.

In some example embodiments, the development system 110 may include a configuration controller 115 configured to generate, for each cloud-based software application available from a developer associated with the development system 110, a template configured to support configuration data for establishing connectivity between one or more combinations of the cloud-based software applications. For example, the configuration controller 115 may generate, for the first cloud-based software application 125*a*, a template that is configured to support a first configuration data for establishing connectivity between the first cloud-based software application 125*a* and the second cloud-based software application 125*b* as well as a second configuration data for establishing connectivity between the first cloud-based software application 125*a* and the third cloud-based software application 125*c*. The template associated with each of the first cloud-based software application 125*a*, the second cloud-based software application 125*b*, and the third cloud-based software application 125*c* may be stored in a database 150 coupled with the development system 110.

In some example embodiments, the configuration controller 115 may determine, for example as part of scoping a complex cloud-based system for a tenant associated with the production system 120, that the tenant requires a combination that includes the first cloud-based software application 125*a* and the second cloud-based software application 125*b*.

As such, the configuration controller 115 may deliver, in a transport request to the production system 120, the template associated with each of the first cloud-based software application 125a and the second cloud-based software application 125b as well as the first configuration data for establishing connectivity between the first cloud-based software application 125a and the second cloud-based software application 125b. The first cloud-based software application 125a and the second software application 125b may be implemented at the production system 120 by at least deploying the corresponding templates.

Table 1 below depicts pseudo programming code for a template defining the manner in which data is stored in a database table. In the example shown in Table 1, the template may include Extensible Markup Language (XML) defining the manner in which data is stored in a database table. However, it should be appreciated that the template may include a different representation of the manner in which data is stored in a database table including, for example, JavaScript Object Notation (JSON), Hypertext Markup Language (HTML), and/or the like.

TABLE 1

```
<item>
<object_name> manufacturing method </object_name>
<object_type> table_content</object_type>
<table_name>tab_manufacuring</table_name>
<field> method</field>
<content>batch</content>
<field>product</field>
<content>medicine</content>
</item>
```

Moreover, connectivity between the first cloud-based software application 125a and the second cloud-based software application 125b may be realized by deploying, at the production system 120, the first configuration data. For example, the first configuration data may include one or more scripts, which may be executed at the production system 120 to set the credentials (e.g., universal resource locator (URL), username, certificate, password, and/or the like) that enables the first cloud-based software application 125a to access one or more functionalities of the second cloud-based software application 125b. Connectivity between the first cloud-based software application 125a and the second cloud-based software application 125b may be required for interoperability between the first cloud-based software application 125a and the second cloud-based software application 125b. For example, a user at the client 140 may access a first functionality of the first cloud-based software application 125a, which may in turn require the first cloud-based software application 125a to invoke a second functionality of the second cloud-based software application 125b.

Figure 2:
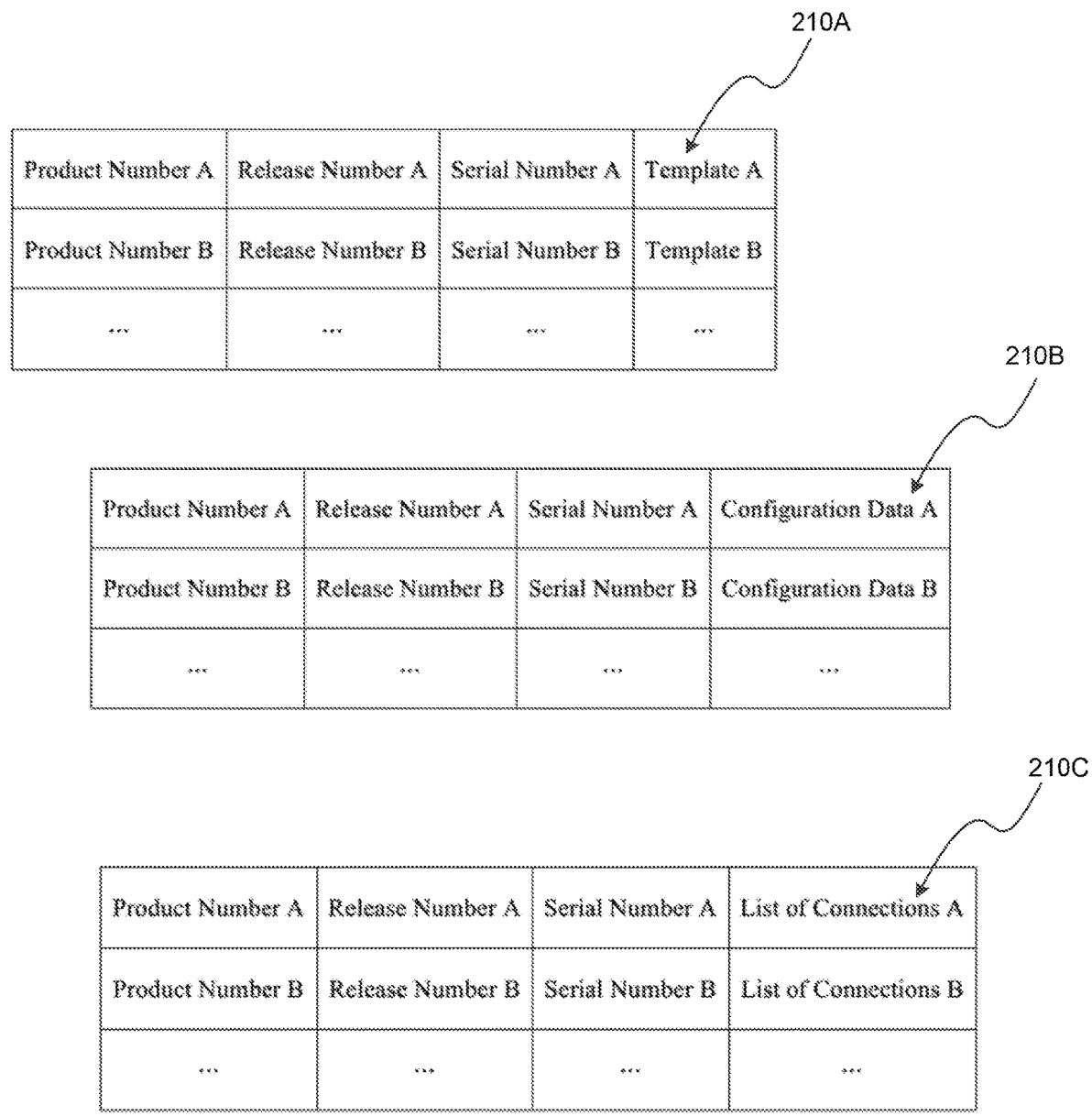
FIG. 2 depicts a block diagram illustrating an example of a database, in accordance with some example embodiments.

FIG. 2 depicts a block diagram illustrating an example of the database 150, in accordance with some example embodiments. Referring to FIGS. 1-2, the templates for each of the first cloud-based software application 125a, the second cloud-based software application 125b, and the third cloud-based software application 125c may be stored in the database 150, for example, in a first database table 210A. For example, the first database table 210A may store the template associated with the first cloud-based software application 125a as a binary large object (or a different type of data object) that is associated with one or more identifiers of the first cloud-based software application 125a (e.g., product number, release number, serial number, and/or the like).

As shown in FIG. 2, the database 150 may further include a second database table 210B storing the first configuration data for establishing connectivity between the first cloud-based software application 125a and the second cloud-based software application 125b and the second configuration data for establishing connectivity between the first cloud-based software application 125a and the third cloud-based software application 125c. For example, the first configuration data and the second configuration data may each be associated with one or more identifiers of the first cloud-based software application 125a (e.g., product number, release number, serial number, and/or the like). Moreover, the database 150 may include a third database table 210C identifying the connectivity data that is available for each cloud-based software application available from the development system 120. For instance, the third database table 210C may store an indication that the first configuration data is available for establishing connectivity between the first cloud-based software application 125a and the second cloud-based software application 125b and that the second configuration data is available for establishing connectivity between the first cloud-based software application 125a and the third cloud-based software application 125c.

In some example embodiments, upon determining that the tenant requires a combination that includes the first cloud-based software application 125a and the second cloud-based software application 125b, the configuration controller 115 may determine, based at least on the third database table 210C, that the first configuration data is available for establishing connectivity between the first cloud-based software application 125a and the second cloud-based software application 125b. Accordingly, the configuration controller 115 may query the database 150 to retrieve the first configuration data from the second database table 210B as well as the templates for each of the first cloud-based software application 125a and the second cloud-based software application 125b from the first database table 210A. Moreover, the configuration controller 115 may send, in a transport request to the production system 120, the template for each of the first cloud-based software application 125a and the second cloud-based software application 125b as well as the first configuration data for establishing connectivity between the first cloud-based software application 125a and the second cloud-based software application 125b.

Figure 3:
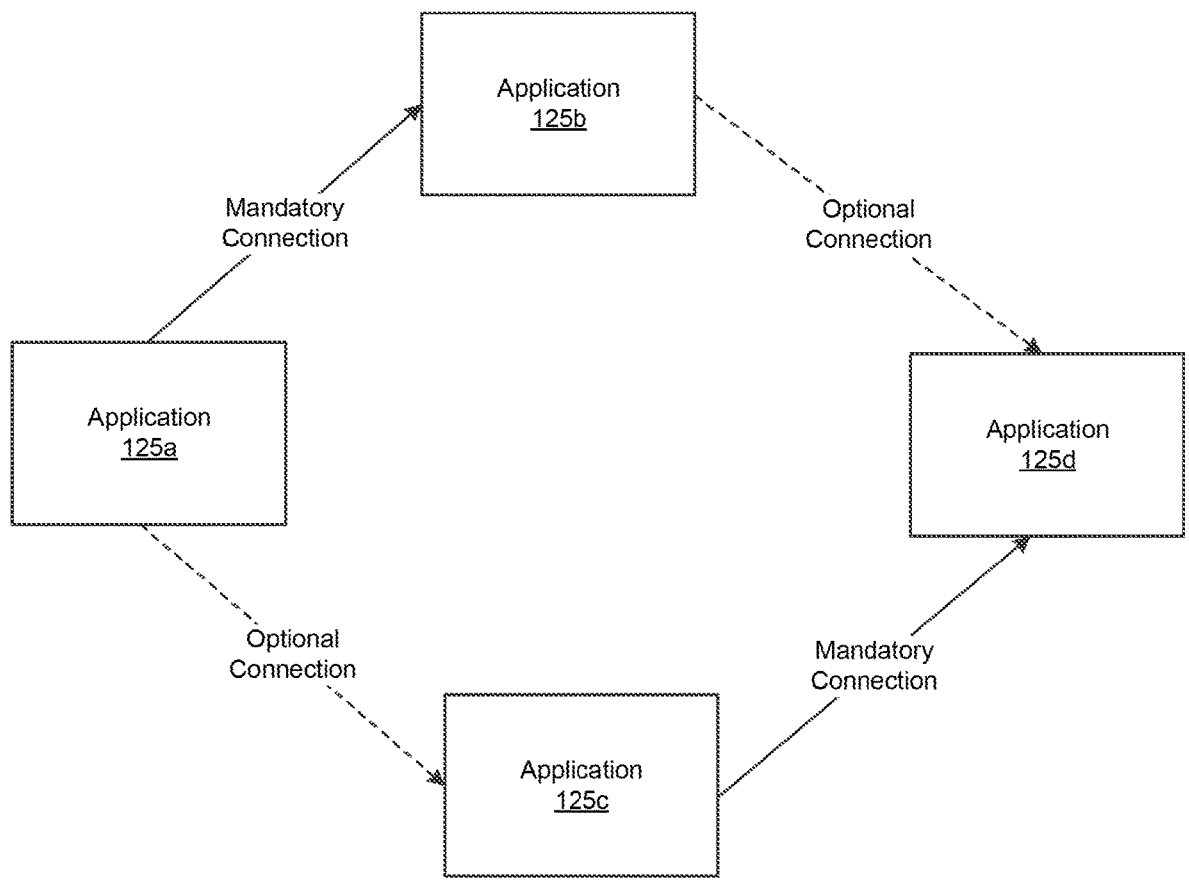
FIG. 3 depicts a block diagram illustrating an example of connectivity between cloud-based software applications, in accordance with some example embodiments.

FIG. 3 depicts a block diagram illustrating an example of connectivity between cloud-based software applications, in accordance with some example embodiments. As shown in FIG. 3, a variety of connections may exist between different cloud-based software applications including, for example, the first cloud-based software application 125a, the second cloud-based software application 125b, the third cloud-based software application 125c, and a fourth cloud-based software application 125d. For example, the connection between the first cloud-based software application 125a and the second cloud-based software application 125b may be mandatory but the connection between the first cloud-based software application 125a and the third cloud-based software application 125c may be optional.

Accordingly, in some example embodiments, the one or more scripts included in the first configuration data for establishing the mandatory connection between the first cloud-based software application 125a and the second cloud-based software application 125b may be executed automatically at the production system 120, for example, to set the credentials (e.g., universal resource locator (URL), username, certificate, password, and/or the like) required for the first cloud-based software application 125a to access one or more functionalities of the second cloud-based software application 125b. Contrastingly, the one or more scripts included in the second configuration data for establishing the optional connection between the first cloud-based software application 125a and the third cloud-based software application 125c may not be subject to automatic execution. Instead, the one or more scripts included in the second configuration data for establishing the optional connection between the first cloud-based software application 125a and the third cloud-based software application 125c may be executed at the discretion of the tenant associated with the production system 120.

Figure 4:
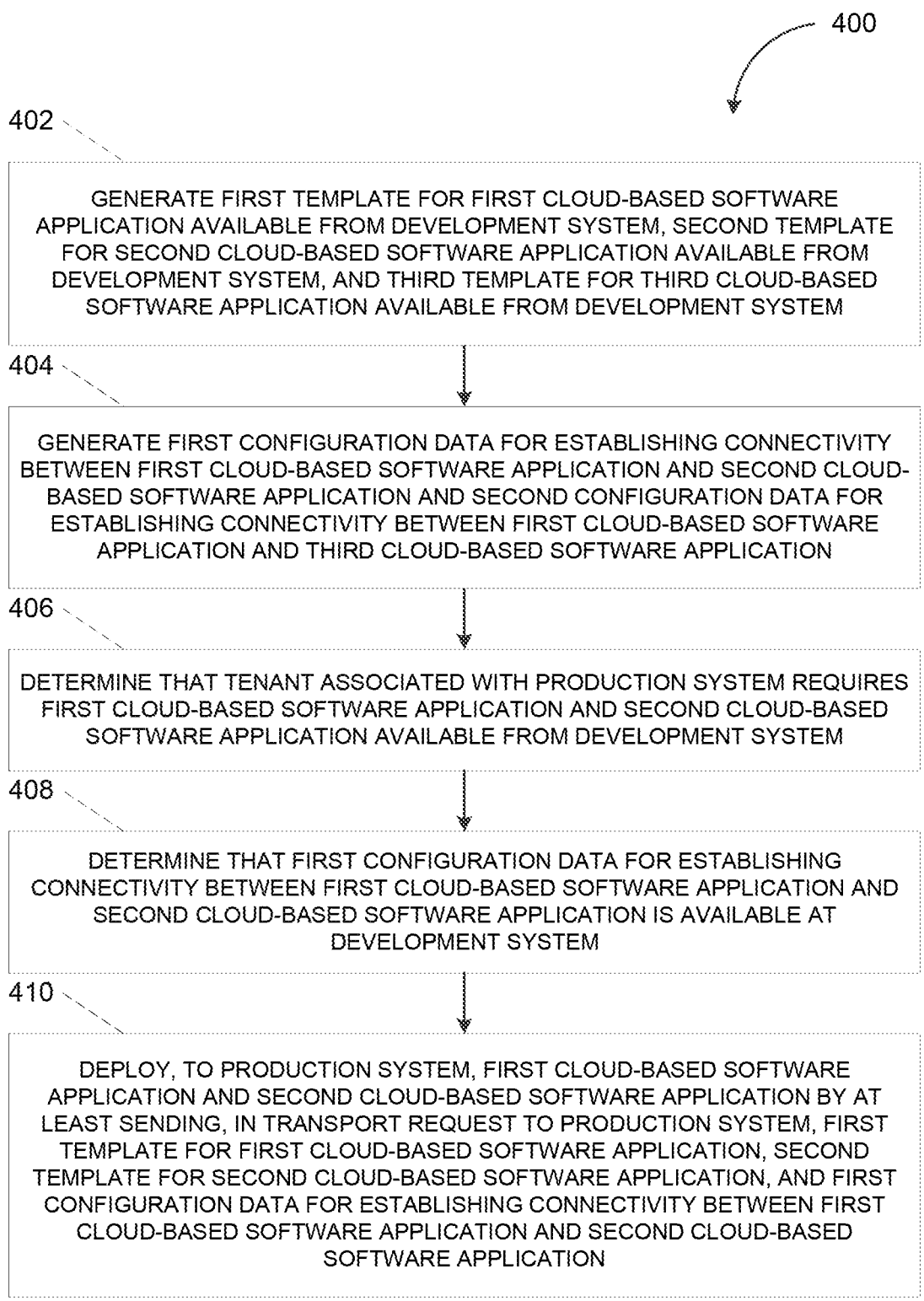
FIG. 4 depicts a flowchart illustrating a process for template based configuration of multiple cloud-based systems, in accordance with some example embodiments.

FIG. 4 depicts a flowchart illustrating an example of a process 400 for template based configuration of multiple cloud-based systems, in accordance with some example embodiments. Referring to FIGS. 1-4, the configuration controller 115 at the production system 110 may perform the process 400 in order to provide, to the production system 120, the templates a combination of cloud-based software applications as well as configuration data for establishing connectivity between the cloud-based software applications.

At 402, the configuration controller 115 may generate a first template for the first cloud-based software application 125a available from the development system 110, a second template for the second cloud-based software application 125b available from the development system 110, and/or a third template for the third cloud-based software application 125c available from the development system 110. For example, the first cloud-based software application 125a, the second cloud-based software application 125b, and the third cloud-based software application 125c may each operate on data stored in one or more database tables. Accordingly, the configuration controller 115 may generate, for each of the first cloud-based software application 125a, the second cloud-based software application 125b, and the third cloud-based software application 125c, a template defining the manner in which data is stored in the one or more database tables.

At 404, the configuration controller 115 may generate the first configuration data for establishing connectivity between the first cloud-based software application 125a and the second cloud-based software application 125b and/or the second configuration data for establishing connectivity between the first cloud-based software application 125a and the third cloud-based software application 125c. In some example embodiments, connectivity between the first cloud-based software application 125a and the second cloud-based software application 125b may be required in order for the first cloud-based software application 125a to access one or more functionalities of the second cloud-based software application 125b. Accordingly, the first configuration data may include one or more scripts that may be executed to set the credentials (e.g., universal resource locator (URL), username, certificate, password, and/or the like) for accessing the second cloud-based software application 125b. Alternatively and/or additionally, connectivity between the first cloud-based software application 125a and the third cloud-based software application 125c may be required in order for the first cloud-based software application 125a to access one or more functionalities of the third cloud-based software application 125c. The second configuration data may therefore include one or more scripts that may be executed to set the credentials (e.g., universal resource locator (URL), username, certificate, password, and/or the like) for accessing the third cloud-based software application 125c.

At 406, the configuration controller 115 may determine that the tenant associated with the production system 120 requires the first cloud-based software application 125a and the second cloud-based software application 125b available from the development system 110. For example, the configuration controller 115 may determine that the tenant associated with the production system requires the first cloud-based software application 125a and the second cloud-based software application 125b as part of scoping a complex cloud-based system for the tenant.

At 408, the configuration controller 115 may determine that first configuration data for establishing connectivity between the first cloud-based software application 125a and the second cloud-based software application 125b is available at the development system 110. In some implementations of the current subject matter, the database 150 coupled with the configuration controller 115 may include the third database table 210C, which may identify the connectivity data that is available for each cloud-based software application available from the development system 120. As such, the configuration controller 110 may determine, based at least on the third database table 210C, that the first configuration data for establishing a connectivity between the first cloud-based software application 125a and the second cloud-based software application 125b required by the tenant is available at the development system 110, for example, in the second database table 210B included in the database 150.

At 410, the configuration controller 115 may deploy, to the production system 120, the first cloud-based software application 125a and the second cloud-based software application 125b by at least sending, in a transport request to the production system 120, the first template for the first cloud-based software application 125a, the second template for the second cloud-based software application 125b, and the first configuration data for establishing connectivity between the first cloud-based software application 125a and the second cloud-based software application 125b. In some example embodiments, the configuration controller 115 may query the database 150 to retrieve the first configuration data from the second database table 210B as well as the templates for each of the first cloud-based software application 125a and the second cloud-based software application 125b from the first database table 210A. The template for each of the first cloud-based software application 125a and the second cloud-based software application 125b as well as the first configuration data for establishing connectivity between the first cloud-based software application 125a and the second cloud-based software application 125b may be send to the production system 120 as part of a transport request.

According to some example embodiments, connectivity between the first cloud-based software application 125a and the second cloud-based software application 125b may be mandatory or optional. Where a connection between the first cloud-based software application 125a and the second cloud-based software application 125b is mandatory, the one or more scripts included in the first configuration data may be executed automatically at the production system 120, for example, to set the credentials (e.g., universal resource locator (URL), user name, certificate, password, and/or the like) required for the first cloud-based software application 125a to access one or more functionalities of the second cloud-based software application 125b. Alternatively, if the connection between the first cloud-based software application 125a and the second cloud-based software application 125*b* is optional, the one or more scripts included in the first configuration data may be executed at the discretion of the tenant associated with the production system 120.

Figure 5:
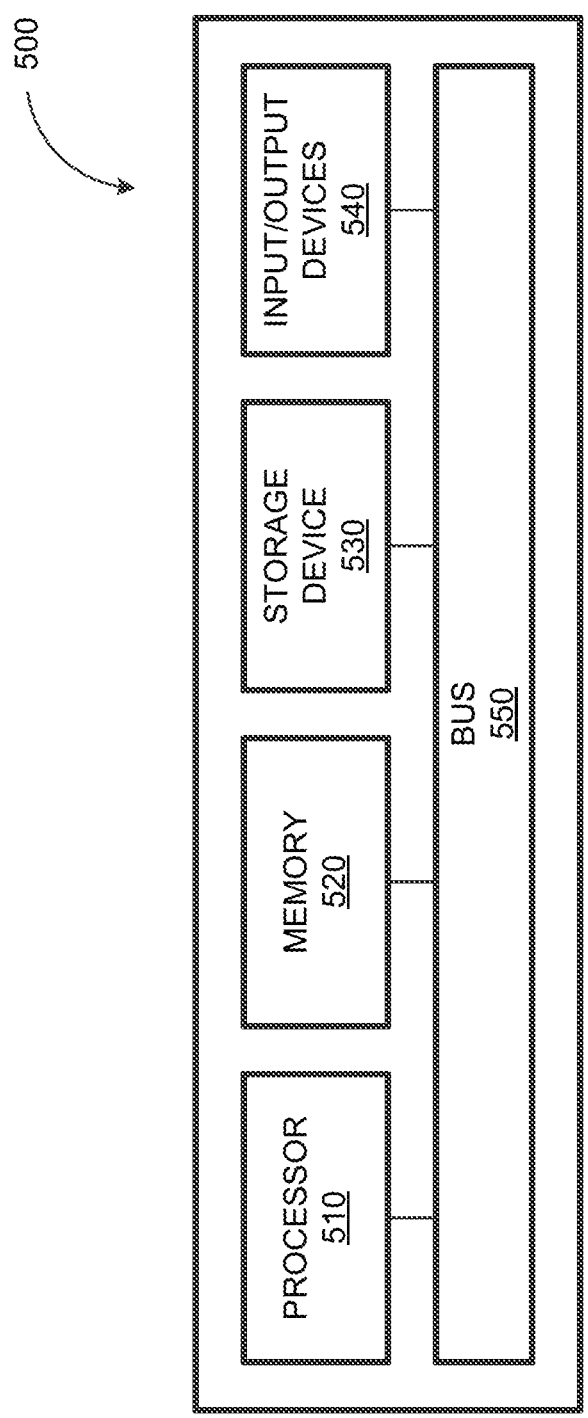
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1-5, the computing system 500 can be used to implement the configuration controller 115 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the configuration controller 115. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions, which when executed by the at least one data processor, result in operations comprising:
   generating, for each of a plurality of software applications available from the development system, a template, the plurality of software applications including a first software application, a second software application, and a third software application;
   generating a first configuration data for establishing a first connection between the first software application and the second software application and a second configuration data for establishing a second connection between the first software application and the third software application;
   determining that a tenant associated with a production system requires the first software application and the second software application available from a development system, the first software application and the second software application each operating on one or more database tables;
   in response to determining that the tenant requires the first software application and the second software application, determining that the first configuration data for establishing the first connection between the first software application and the second software application is available at the development system, the first configuration data establishing the first connection by at least setting one or more credentials that enable the first software application to access one or more functionalities of the second software application; and
   deploying, to the production system, the first software application and the second software application by at least sending, to the production system, a first template for the first software application, a second template for the second software application, and the first configuration data, the first template and the second template each defining the one or more database tables.

2. The system of claim 1, wherein the first template is generated to support the first configuration data and the second configuration data.

3. The system of claim 1, further comprising:
   storing, in a first database table, the first template for the first software application, the second template for the second software application, and a third template for the third software application;
   storing, in a second database table, the first configuration data and the second configuration data; and
   storing, in a third database table, an indication that the first configuration data is available for establishing the first connection between the first software application and that the second configuration data is available for establishing a second connection between the first software application and the third software application.

4. The system of claim 3, wherein the deploying of the first software application and the second software application further includes:
   retrieving, from the first database table, the first template and the second template; and
   in response to determining, based at least on the third database table, that the first configuration data is available for establishing the first connection between the first software application and the second software application, retrieving, from the second database table, the first configuration data.

5. The system of claim 1, wherein the first connection comprises a mandatory connection, and wherein the second connection comprises an optional connection.

6. The system of claim 5, wherein the first configuration data includes one or more scripts configured for automatic execution at the production system in order to establish the mandatory connection between the first software application and the second software application.

7. The system of claim 1, wherein the one or more credentials include a universal resource locator, a username, a certificate, and/or a password.

8. The system of claim 1, wherein the first software application and the second software application each comprise a different one of an enterprise resource planning (ERP) software application, a customer relationship management (CRM) software application, and a supply chain management (SCM) software application.

9. The system of claim 1, wherein the first software application is hosted by a first cloud-based system and the second software application is hosted by a second cloud-based system.

10. A computer-implemented method, comprising:
    generating, for each of a plurality of software applications available from the development system, a template, the plurality of software applications including a first software application, a second software application, and a third software application;
    generating a first configuration data for establishing a first connection between the first software application and the second software application and a second configuration data for establishing a second connection between the first software application and the third software application;
    determining that a tenant associated with a production system requires the first software application and the second software application available from a development system, the first software application and the second software application each operating on one or more database tables;
    in response to determining that the tenant requires the first software application and the second software application, determining that the first configuration data for establishing the first connection between the first software application and the second software application is available at the development system, the first configuration data establishing the first connection by at least setting one or more credentials that enable the first software application to access one or more functionalities of the second software application; and deploying, to the production system, the first software application and the second software application by at least sending, to the production system, a first template for the first software application, a second template for the second software application, and the first configuration data, the first template and the second template each defining the one or more database tables.

11. The method of claim 10, wherein the first template is generated to support the first configuration data and the second configuration data.

12. The method of claim 10, further comprising:

storing, in a first database table, the first template for the first software application, the second template for the second software application, and a third template for the third software application;

storing, in a second database table, the first configuration data and the second configuration data; and storing, in a third database table, an indication that the first configuration data is available for establishing the first connection between the first software application and that the second configuration data is available for establishing a second connection between the first software application and the third software application.

13. The method of claim 12, wherein the deploying of the first software application and the second software application further includes:

retrieving, from the first database table, the first template and the second template; and in response to determining, based at least on the third database table, that the first configuration data is available for establishing the first connection between the first software application and the second software application, retrieving, from the second database table, the first configuration data.

14. The method of claim 10, wherein the first connection comprises a mandatory connection, and wherein the second connection comprises an optional connection.

15. The method of claim 14, wherein the first configuration data includes one or more scripts configured for automatic execution at the production system in order to establish the mandatory connection between the first software application and the second software application.

16. The method of claim 10, wherein the one or more credentials include a universal resource locator, a username, a certificate, and/or a password.

17. The system of claim 1, wherein the first software application is hosted by a first cloud-based system and the second software application is hosted by a second cloud-based system.

18. A non-transitory computer readable medium storing instructions, which when executed by at least one data processor, result in operations comprising:

generating, for each of a plurality of software applications available from the development system, a template, the plurality of software applications including a first software application, a second software application, and a third software application;

generating a first configuration data for establishing a first connection between the first software application and the second software application and a second configuration data for establishing a second connection between the first software application and the third software application;

determining that a tenant associated with a production system requires the first software application and the second software application available from a development system, the first software application and the second software application each operating on one or more database tables;

in response to determining that the tenant requires the first software application and the second software application, determining that the first configuration data for establishing the first connection between the first software application and the second software application is available at the development system, the first configuration data establishing the first connection by at least setting one or more credentials that enable the first software application to access one or more functionalities of the second software application; and deploying, to the production system, the first software application and the second software application by at least sending, to the production system, a first template for the first software application, a second template for the second software application, and the first configuration data, the first template and the second template each defining the one or more database tables.

* * * * *